US011548425B2

United States Patent
Salter et al.

(10) Patent No.: US 11,548,425 B2
(45) Date of Patent: Jan. 10, 2023

(54) VEHICLE ASSIST HANDLE ASSEMBLY HAVING AN INDUCTIVE CHARGER

(71) Applicant: Ford Global Technologies, LLC, Dearborn, MI (US)

(72) Inventors: Stuart C. Salter, White Lake, MI (US); David Brian Glickman, Southfield, MI (US); Annette Lynn Huebner, Highland, MI (US); Jim Baumbick, Northville, MI (US); Paul Kenneth Dellock, Northville, MI (US); Daniel J. Martin, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 17/032,282

(22) Filed: Sep. 25, 2020

(65) Prior Publication Data

US 2022/0097583 A1 Mar. 31, 2022

(51) Int. Cl.
*B60N 3/02* (2006.01)
*B60R 16/03* (2006.01)
*B60R 7/04* (2006.01)
*H02J 50/80* (2016.01)
*H02J 50/00* (2016.01)
*H02J 50/10* (2016.01)

(52) U.S. Cl.
CPC ............... *B60N 3/02* (2013.01); *B60R 7/04* (2013.01); *B60R 16/03* (2013.01); *H02J 50/005* (2020.01); *H02J 50/10* (2016.02); *H02J 50/80* (2016.02)

(58) Field of Classification Search
CPC .......... B60N 3/02; B60N 3/023; B60N 3/026; B60R 7/04; B60R 16/03; H02J 50/005; H02J 50/10; H02J 50/80; H02J 7/0047; H02J 50/90; H02J 7/0042
See application file for complete search history.

(56) References Cited

U.S. PATENT DOCUMENTS

| | | | |
|---|---|---|---|
| 6,431,643 B2 | 8/2002 | Grey | |
| 7,270,359 B2 | 9/2007 | Sparks et al. | |
| 7,400,232 B2 | 7/2008 | Reichling et al. | |
| 7,661,704 B2 | 2/2010 | Chen et al. | |
| 8,444,196 B2 * | 5/2013 | Arndt | B60R 7/04 296/187.05 |
| 8,690,402 B2 | 4/2014 | Durkin et al. | |
| 8,827,516 B2 | 9/2014 | Stakoe et al. | |
| 8,922,340 B2 | 12/2014 | Salter et al. | |
| 9,079,542 B1 | 7/2015 | Ross et al. | |
| 10,071,665 B2 | 9/2018 | Ibrahim et al. | |
| 10,343,575 B1 | 7/2019 | Lynn et al. | |

(Continued)

FOREIGN PATENT DOCUMENTS

DE 102011112438 A1 3/2013
DE 102018221662 A1 6/2020

*Primary Examiner* — Stacy Whitmore
(74) *Attorney, Agent, or Firm* — Vichit Chea; Price Heneveld LLP

(57) ABSTRACT

An assist handle assembly for a vehicle is provided. The assist handle assembly includes an assist handle configured to be gripped by a user, a hanger connected to the assist handle and configured to hang a holder configured to hold an electronic device, a charger configured to charge an electronic device held in the holder hanging on the hanger, and a connector configured to secure the assist handle assembly to a structural component of the vehicle.

16 Claims, 7 Drawing Sheets

(56) References Cited

U.S. PATENT DOCUMENTS

| | | | |
|---|---|---|---|
| 10,378,254 B1 | 8/2019 | Salter et al. | |
| 10,457,183 B2 | 10/2019 | Frederick et al. | |
| 10,604,079 B2 | 3/2020 | Lockwood et al. | |
| 10,668,847 B2 | 6/2020 | Takenaka et al. | |
| 2004/0145457 A1 | 7/2004 | Schofield et al. | |
| 2009/0195006 A1* | 8/2009 | Lim | B60R 11/00 |
| | | | 296/37.16 |
| 2010/0230457 A1* | 9/2010 | Beyer | B60N 3/12 |
| | | | 224/539 |
| 2012/0262117 A1* | 10/2012 | Ferber | H02J 7/0048 |
| | | | 320/111 |
| 2015/0084578 A1* | 3/2015 | Pickens | H02J 7/342 |
| | | | 320/103 |
| 2015/0330112 A1 | 11/2015 | Van Wiemeersch et al. | |
| 2016/0087485 A1* | 3/2016 | Maeda | H02J 50/60 |
| | | | 455/573 |
| 2018/0070693 A1* | 3/2018 | Bloomfield | A45C 3/001 |
| 2019/0061631 A1 | 2/2019 | Lockwood et al. | |
| 2019/0077324 A1* | 3/2019 | Dunham | B60N 2/78 |
| 2020/0223366 A1* | 7/2020 | Heinz | E05B 47/0002 |
| 2021/0376658 A1* | 12/2021 | Marino | A45C 15/00 |

* cited by examiner

VEHICLE ASSIST HANDLE ASSEMBLY HAVING AN INDUCTIVE CHARGER

FIELD OF THE DISCLOSURE

The present disclosure generally relates to assist handles, and more particularly relates to a vehicle mounted assist handle assembly having an accessory.

BACKGROUND OF THE DISCLOSURE

Automotive vehicles are commonly equipped with handle structures referred to as passenger assist handles for passengers to grasp with their hand when entering and exiting the vehicle and during maneuvering of the vehicle. Assist handles can be particularly useful for off-road-style vehicles while driving on rough road conditions. In off-road style vehicles and other types of vehicles, it may be desirable to provide an accessory with the assist handle, particularly for customizable vehicle interiors.

SUMMARY OF THE DISCLOSURE

According to a first aspect of the present disclosure, an assist handle assembly for a vehicle. The assist handle assembly for a vehicle includes an assist handle configured to be gripped by a user, a wireless charger configured to charge a chargeable electronic device positioned proximate to a charging region of the charger, and a connector configured to secure the assist handle assembly to a structural component of the vehicle.

Embodiments of the first aspect of the disclosure can include any one or a combination of the following features:
- a hanger connected to the assist handle and configured to hang a holder configured to hold a chargeable electronic device;
- a power cable for connecting to a vehicle power supply;
- the wireless charger includes an inductive charger configured to inductively couple with charging circuitry in the electronic device;
- the inductive charger includes inductive charging circuitry configured to couple with charging circuitry in the chargeable electronic device;
- a wireless communication link;
- the wireless communication link communicates with the chargeable electronic device and one or more communication links on the vehicle to determine a location of the electronic device and a charging status of the chargeable electronic device;
- a human machine interface output for communicating the charging status of the chargeable electronic device;
- the location of the electronic device is determined by processing wireless signals transmit between the electronic device and one or more signal communication devices on the vehicle;
- the chargeable electronic device comprise a phone; and
- the connector is releasable to allow assembly and disassembly of the assist handle assembly from the vehicle.

According to a second aspect of the present disclosure, an assist handle assembly for a vehicle. The assist handle assembly for a vehicle includes an assist handle configured to be gripped by a user, a hanger connected to the assist handle and configured to hang a holder configured to hold a chargeable electronic device, an inductive charger configured to inductively couple with charging circuitry in the chargeable electronic device to charge the chargeable electronic device held in the holder hanging on the hanger, and a connector configured to secure the assist handle assembly to a structural component of the vehicle.

Embodiments of the second aspect of the disclosure can include any one or a combination of the following features:
- a power cable for connecting to a vehicle power supply;
- a wireless communication link;
- the wireless communication link communicates with the electronic device and one or more communication links on the vehicle to determine a location of the electronic device and a charging status of the chargeable electronic device;
- a human machine interface output for communicating the charging status of the chargeable electronic device;
- the inductive charger includes inductive charging circuitry configured to couple with charging circuitry in the chargeable electronic device;
- the electronic device comprise a phone;
- the connector is releasable to allow assembly and disassembly of the assist handle assembly from the vehicle; and
- the hanger includes a deployable hook.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
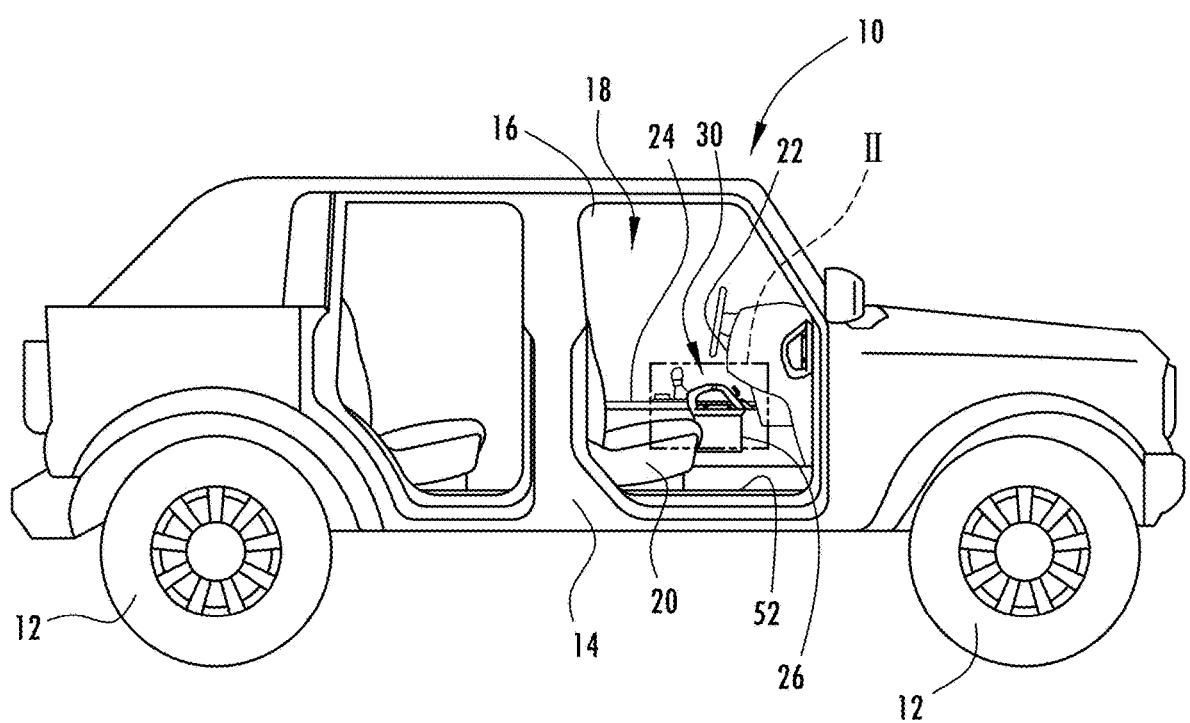
FIG. 1 is a perspective view of a motor vehicle that is configured to include one or more assist handle assemblies.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle assist handle assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-7, a vehicle assist handle assembly 30 is illustrated having an assist handle configured to be gripped by a user and equipped with one or more accessories including a hanger and an inductive charger connected to the assist handle. The vehicle assist handle assembly also includes a connector configured to secure the assist handle assembly to a structural component of the vehicle.

With particular reference to FIG. 1, a motor vehicle 10 is generally illustrated. The motor vehicle 10 is generally shown as an off-road style, wheeled vehicle that may be driven on a roadway or driven off-road on various types of terrain. The motor vehicle 10 generally includes a plurality of road wheels 12 and a vehicle body 14 generally defining a passenger compartment 18 with ingress/egress openings 16 which may be closed with doors. The doors may include hingedly connected door panels with windows or crossbars having exposed openings that may be fixedly installed or removable, according to various examples. While a wheeled vehicle is generally shown and described herein, it should be appreciated that other vehicles such as boats, trains, planes and other vehicles may be equipped with the assist handle assembly 30.

The motor vehicle 10 is configured to include one or more seats 20 for holding passengers seated within the passenger compartment 18 of the vehicle 10. In a typical passenger vehicle seating arrangement, a front row of bucket seats may include two seats spaced apart and the second row may have a bench seat configuration that may include a row of three seats or may include two seats separated by a rear center console. The front row seats 20 are generally rearward of a dashboard 22. A front center console 24 is shown located centrally within the front row of seats 20 between a driver seat and a passenger seat. The center console 24 may be configured with storage compartments, drink holders and other features. An assist handle assembly 30 is shown connected to the center console 24 proximate an upper side of a side wall 26, according to one embodiment.

Figure 2:
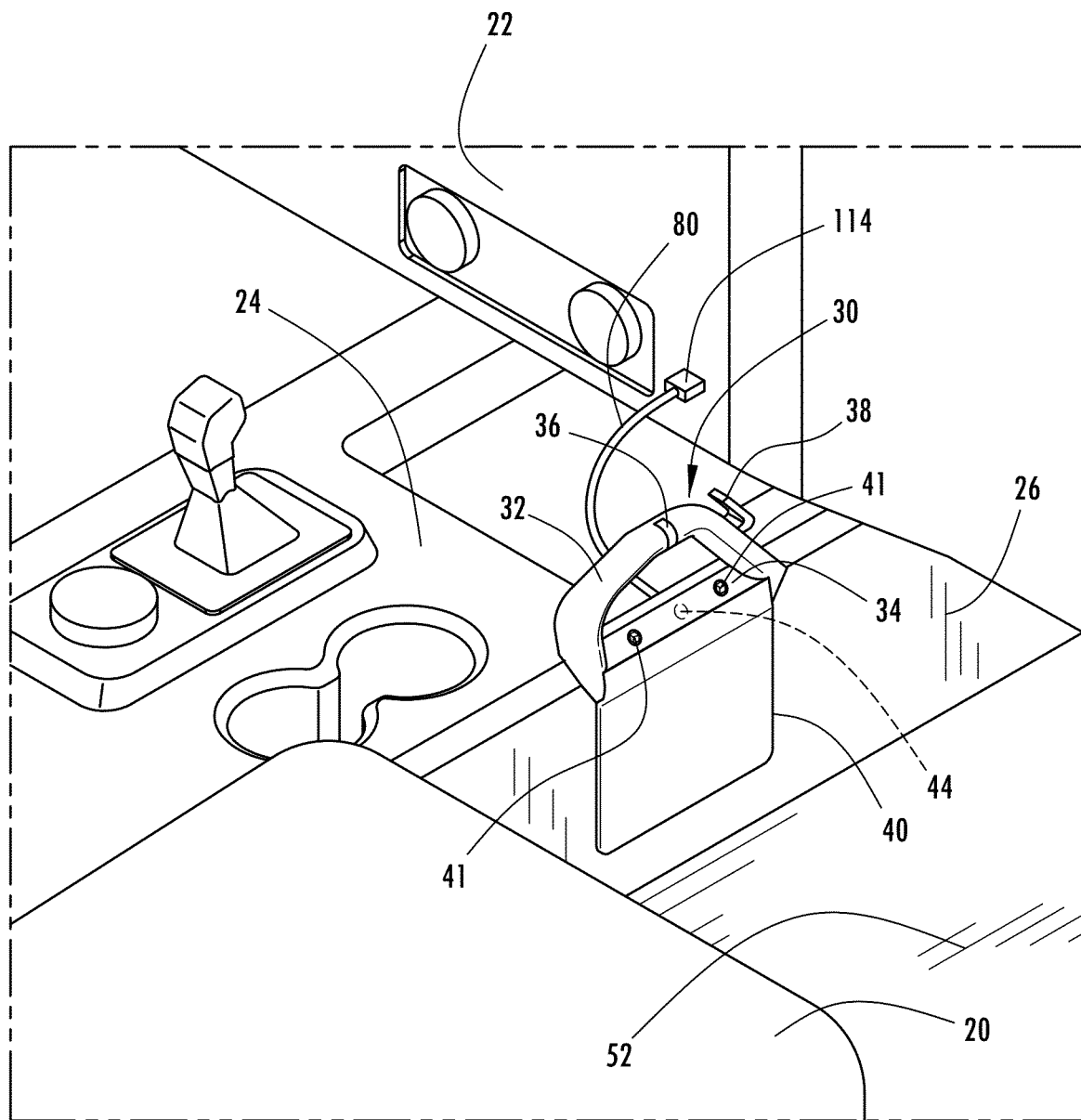
FIG. 2 is an enlarged view of section II of FIG. 1 further illustrating an assist handle assembly mounted to a center console of the vehicle, according to one embodiment.

Referring to FIG. 2, the assist handle assembly 30 is shown assembled onto a passenger side of the center console 24 and positioned to enable a passenger seated on seat 20 to engage and grip the assist handle assembly 30 with a hand for support while entering the vehicle and while traveling in the vehicle 10. For example, when the vehicle 10 is traveling off-road on rough terrain, a passenger seated on the passenger seat 20 may grip the assist handle assembly 30 for purposes of maintaining balance and stability. While the assist handle assembly 30 is shown located on the passenger facing side of the center console 24, it should be appreciated that the assist handle assembly 30 may be located on the driver side of the center console 24, on the vehicle body side of a passenger seat, in the rear row of seating such as on a rear center console or at other locations within the vehicle 10.

The assist handle assembly 30 includes a handle base 34 that connects to the center console 24 and an assist handle 32 designed to receive and support a user's hand gripped thereto. The handle base 34 is connected to the center console 24 via an underlying bracket and fasteners 41 as shown and described herein. The assist handle assembly 30 serves both as an assist handle and a hanger and an inductive charger that includes at least one hanger provided on the assist handle configured to hang a holder that may be configured to hold an electronic device in position to be charged by the inductive charger. In the embodiment shown, the assist handle assembly 30 includes a deployable first hanger 36 located on an upper side portion of the assist handle 32 and a fixed second hanger 38 shown located on the vehicle forward side of the assist handle 32. The assist handle assembly 30 also includes a wireless charger, in the form of an inductive charger 40, connected to the handle base 34 and configured to charge a chargeable electronic device held in a holder hanging on one of the hangers 36 and 38. The inductive charger 40 is shown extending downward along the outer surface of the side wall 26 of the center console 24 so as to provide a charging region proximate, e.g., within 10 cm, the surface of the inductive charger 40. The inductive charger 40 may extend vertical or may be angled to conform to the angle of the side wall 26.

Figure 3:
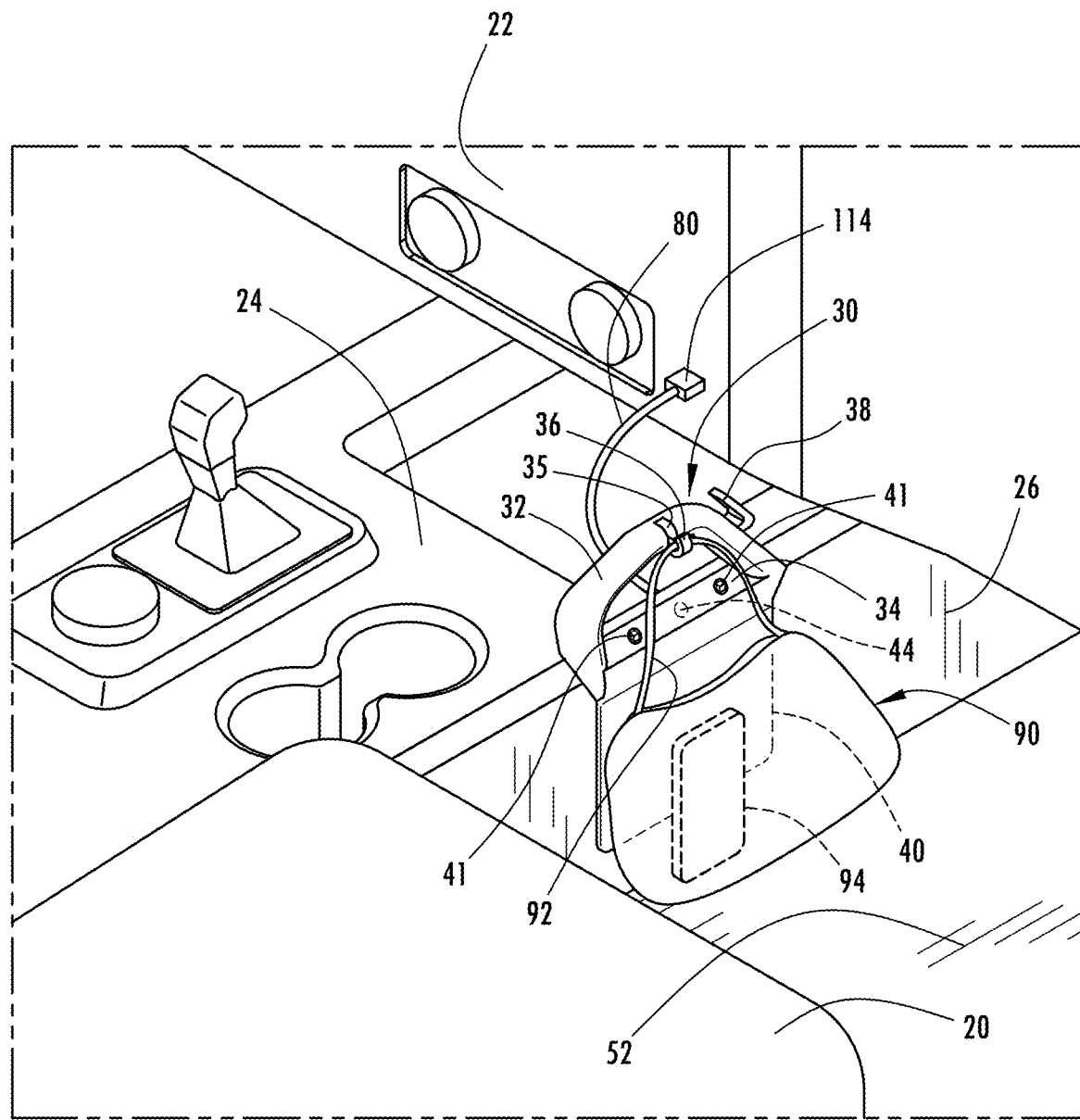
FIG. 3 is a perspective view of the assist handle assembly having a deployable hanger in a use position hanging a holder (e.g., purse) containing an electronic device coupled to an inductive charger, according to one embodiment.
Figure 5A:
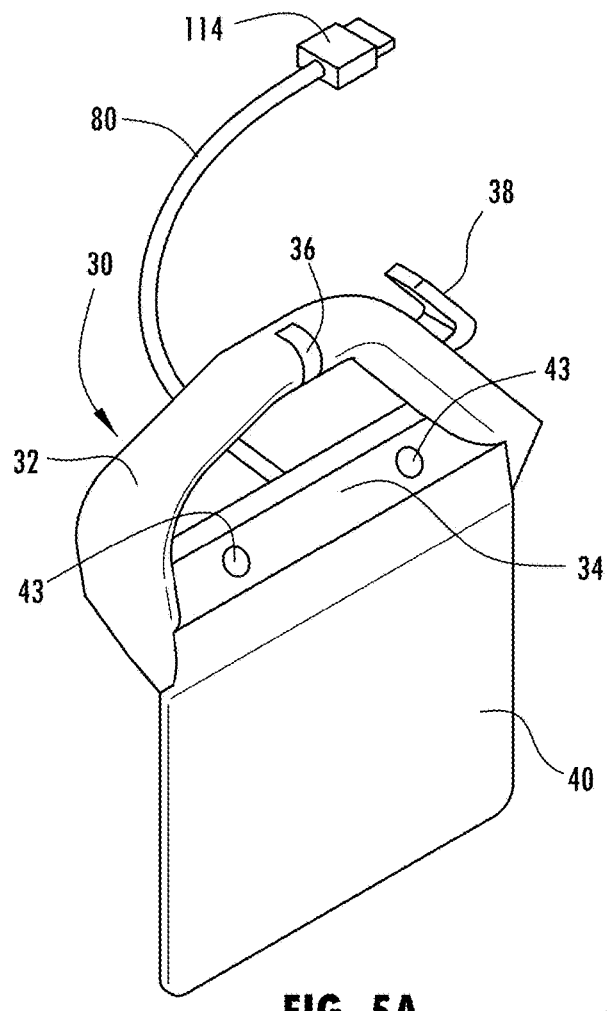
FIG. 5A is a perspective view of the assist handle assembly showing the deployable hanger in the deployed position.
Figure 5B:
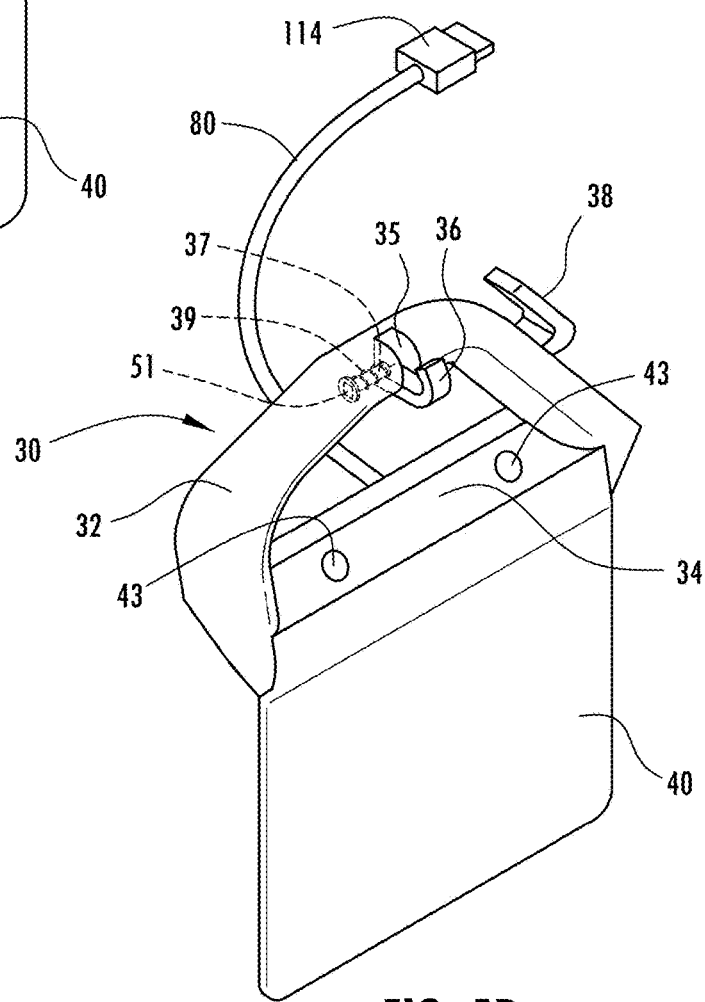
FIG. 5B is a perspective view of the assist handle assembly showing the deployable handle in the deployed position.

The deployable first hanger 36 is shown in a stored position in FIGS. 2 and 5A and may be rotated outward to a deployed position as seen in FIGS. 3 and 5B. The deployable first hanger 36 includes a J-shaped or C-shaped hook that pivots about a pin 37 at one end outward from an opening 35 to enable the hook portion to engage and hang a holder, such as a strap 92 of a bag 90 and hold the hanging bag 90 in a fixed position proximate the inductive charger 40. The bag 90 may be a purse or handbag having one or more compartments for holding one or more items including a chargeable (e.g., rechargeable) electronic device. The J-shaped or C-shaped hook may rotate about one end to a conformal opening 35 into the stored position. The chargeable electronic device 94 should be placed such that the inductive charging circuitry in the electronic device 94 is located within a charging distance of about 10 cm of the inductive charger to ensure sufficient charging. The deployable first hanger 36 may be equipped with a spring 39 to bias the hanger 36 to the stored position and may have a sensor or switch 51 to detect the presence of a bag or other hanging item supported thereon. As seen in FIG. 3, the bag 90 contains a chargeable electronic device 94, such as a phone, which may include inductive charging circuitry that may couple via induction with inductive charging circuitry in the inductive charger 40 to charge the electronic device 94.

Figure 4:
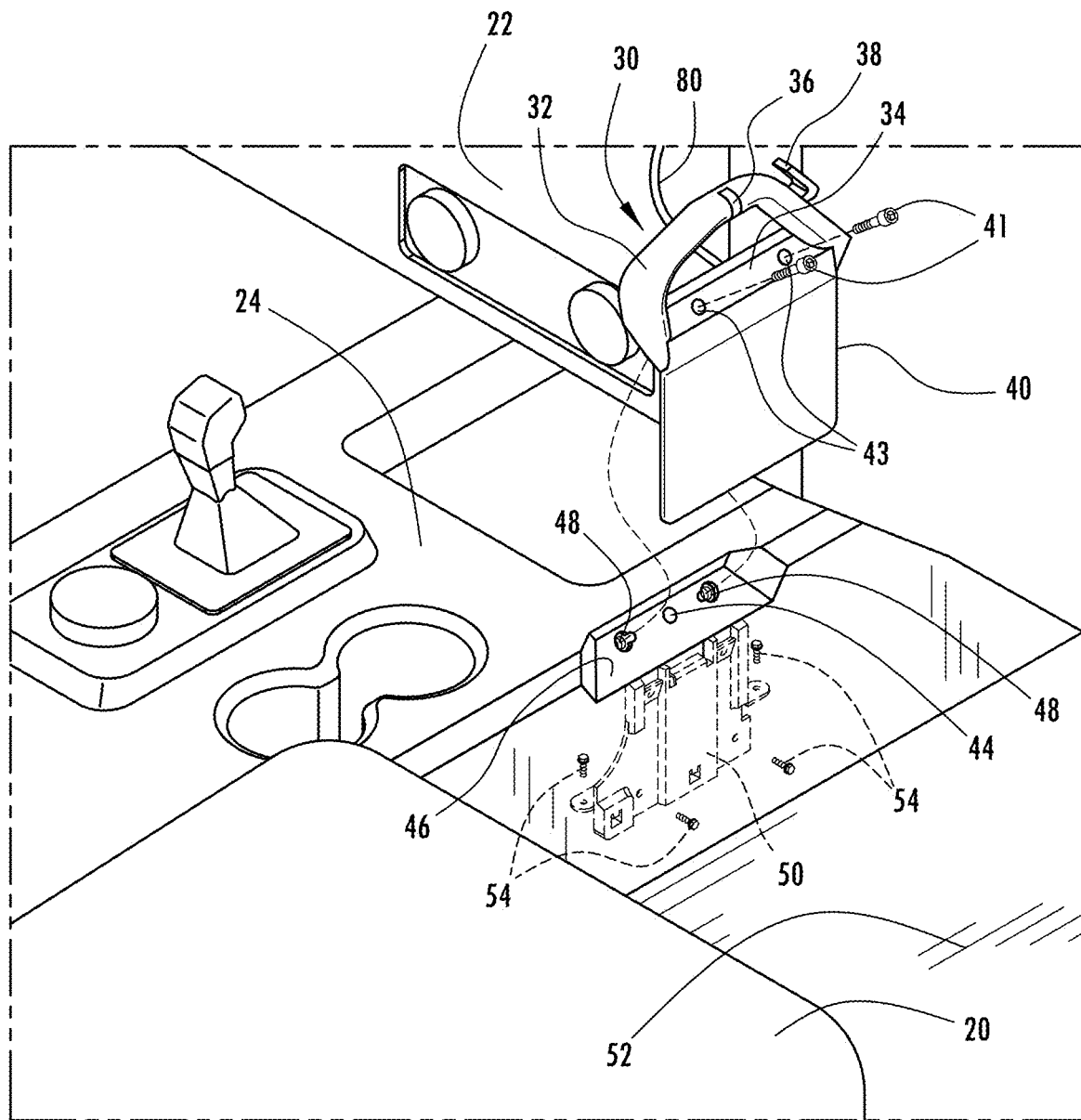
FIG. 4 is an exploded view of the assist handle assembly showing the mounting arrangement onto the center console of the vehicle.

The assist handle assembly 30 is shown in an unassembled state in FIG. 4 for mounting onto a bracket 50 in the center console 24. A pair of threaded fasteners, such as screws 41, extend through openings 43 within the handle base 34 and into threaded recesses 48 in the top plate 46 of bracket 50. The bracket 50 may, in turn, extend to a rigid support structure component such as a vehicle floor 52 where the bottom end of the bracket 50 may be fastened to the floor 52 via threaded fasteners 54. As such, the assist handle assembly 30 is rigidly attached onto the bracket 50 which is fixedly supported by a rigid floor structure component of the vehicle 10 to allow the assist handle to withstand forces experienced during normal use of the assist handle assembly 30.

The assist handle assembly 30 further includes a power cable 80 for connecting to a vehicle power supply and ground. The power cable 80 may have a releasable connector 114 such as a plug-in-connector, e.g., USB connector or a cigarette lighter connector, for supplying electrical power supply and ground connection. A user may plug the power cable connector 114 into a power supply connector on the vehicle 10. The handle base 34 also includes an opening 44 to enable the power cable 80 to be extended through the opening 44 to allow a hidden electrical connection within the center console 24. This may be achieved by using a jumper harness as the power cable 80 to plug into power and ground may also connect to a vehicle controller area network (CAN) bus on the vehicle 10 which may provide power and data communication between the vehicle and the assist handle assembly 30 including the inductive charger 40.

Figure 6:
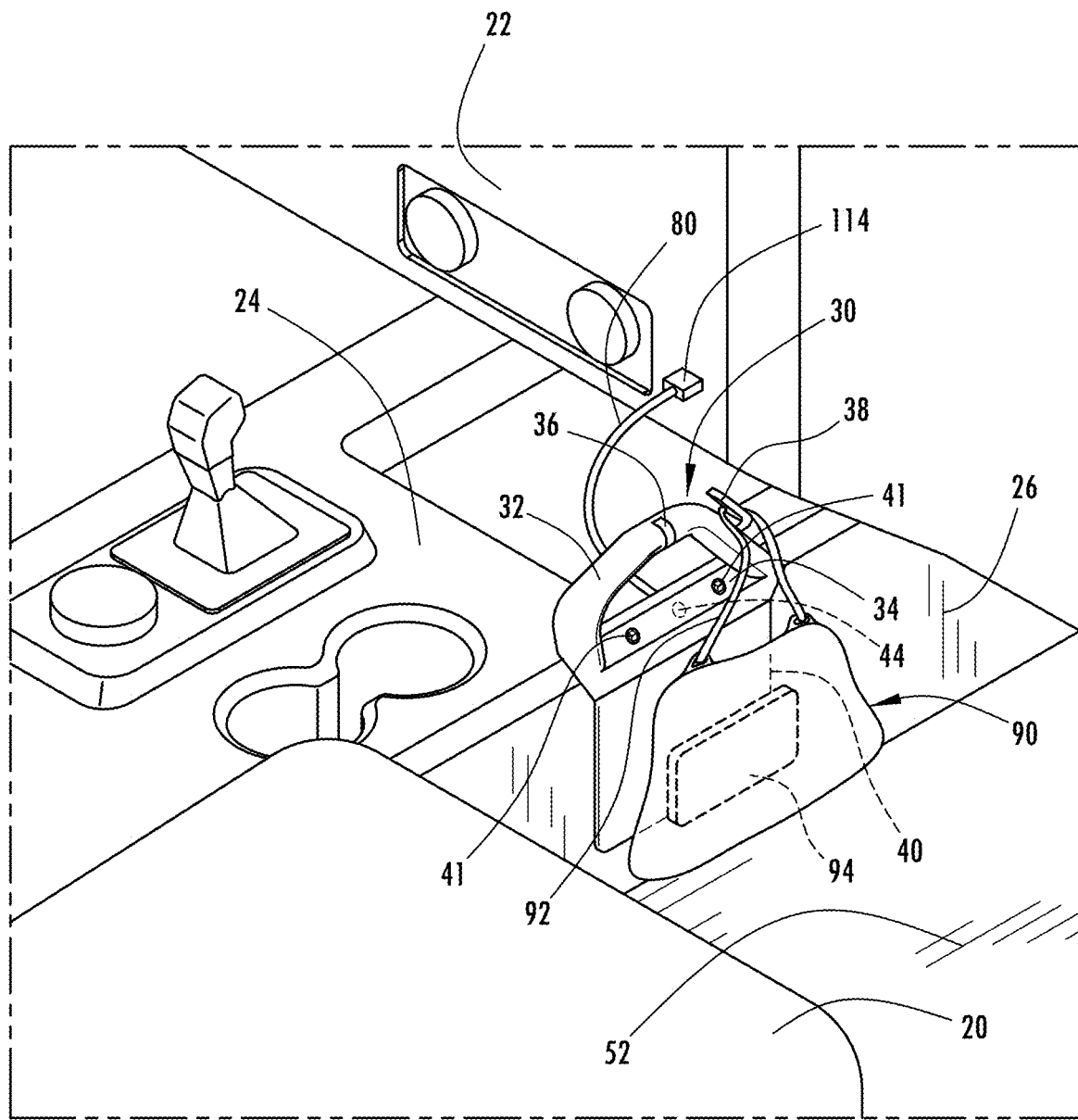
FIG. 6 is a perspective view of the assist handle assembly showing a holder supported on the fixed hanger with a chargeable electronic device coupled to the inductive charger, according to one example.

Referring to FIG. 6, the assist handle assembly 30 is shown having the second fixed hanger 38 supporting a strap 92 of a bag 90 with a chargeable electronic device 94, such as a mobile phone, located within the bag 90 and positioned proximate to the inductive charger 40 so as to enable charging of the electronic device 94. It should be appreciated that a user may hang the bag 90 or other device holder from either the deployable first hanger 36 and/or the fixed second hanger 38, according to a couple of examples. It should be appreciated that the chargeable electronic device 94 should be placed in the bag 90 in a position to enable inductive charging circuitry in the electronic device 94 to be inductively coupled with inductive charging circuitry in the inductive charger 40 so as to enable power to be inductively transferred to the electronic device 94 to charge one or more batteries in the electronic device 94.

Figure 7:
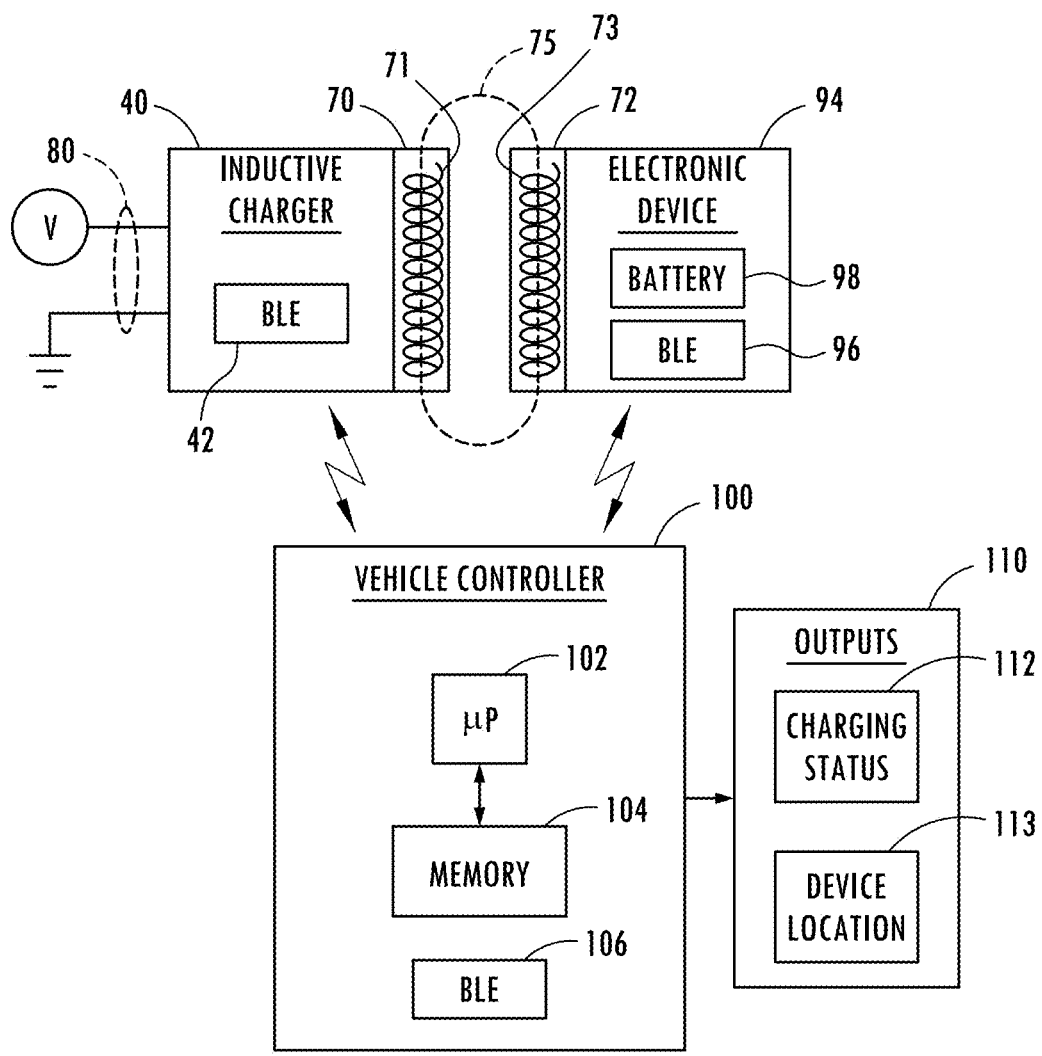
FIG. 7 is a block diagram illustrating communication of a vehicle controller with the inductive charger and a chargeable electronic device, according to one example.

Referring to FIG. 7, the inductive charger 40 is shown having inductive charging circuitry 70 which may include inductive coils 71. The electronic device 94 is also shown having inductive charging circuitry 72 which may likewise include inductive coils 73. When the electronic device 94 is positioned sufficiently close to the inductive charger 40 (e.g., within 10 cm), the inductive charging circuitry 70 in the inductive charger 40 may be inductive coupled to the inductive charging circuitry 72 in the electronic device 94 to enable the inductive charger 40 to charge one or more batteries 98 in the electronic device 94. Typically, this may be achieved by coupling the inductive coils 71 of the inductive charger 40 with the inductive coils 73 of the electronic device 94 to create an inductive field 75. The inductive charger 40 receives power from a voltage supply V and is coupled to ground through the power cable 80. The power cable 80 may be electrically coupled to the vehicle battery and ground via circuitry such as the plug-in connector 114.

The inductive charger 40 and the electronic device 94 may each communicate wirelessly with the vehicle controller 100. According to one embodiment, the inductive charger 40 has wireless communication circuitry 42, such as Bluetooth® (BLE) that may communicate with wireless circuitry 106 (BLE) of the vehicle controller 100. The vehicle controller 100 may include control circuitry, such as a microprocessor 102 and memory 104. The vehicle controller 100 may communicate with the inductive charger 40 and may communicate with the electronic device 94 and may generate outputs 110 such as device charging status 112 of the battery 98 of the electronic device 94 and device location 113. For example, the vehicle controller 100 may determine whether the electronic device 94 is currently charging via the inductive charger 40 or if the position of the electronic device 94 relative to the inductive charger 40 needs to be changed to allow for charging or for enhanced charging. The charging status 112 may be displayed to a user via an output 110 such as a vehicle display or via other human machine interface (HMI).

The vehicle controller 100 may determine the position or location of the chargeable electronic device 94 within the vehicle and relative to the inductive charger 40. This may be achieved by processing wireless signals transmit and received between the electronic device 94 and one or more communication links or devices within the vehicle such as the vehicle controller, the inductive charger and other devices. The position of the electronic device 94 may be determined through triangulation of the wireless signal strength and time to return signals between the plurality of communication devices and the electronic device 94. The wireless signals are processed to determine a location and may be transmit and received via wireless circuitry 96, 42 and 106. As such, the vehicle controller 100 is able to determine the location of the electronic device 94 and determine whether the electronic device 94 is located within a holder held on one or more of the hangers in close proximity to the inductive charger 40. The vehicle controller 100 may then inform a user whether or not the electronic device 94 is located in the holder (e.g., handbag) and whether the electronic device 94 is properly positioned in the charging region to be charged with the inductive charger 40 or whether the electronic device needs to be moved to a better charging position.

Accordingly, the assist handle assembly 30 advantageously provides for an assist handle with a hanger and a charger 40 configured to charge a chargeable electronic device 94 held in a holder hanging on the hanger. This may enable the chargeable electronic device, such as a phone held in a holder, such as a purse or handbag to be charged when held in the holder on the hanger and positioned proximate the inductive charger 40. It should be appreciated that the assist handle may be integrally formed with the fixed hanger and at least a portion of the inductive charger, according to one embodiment. In other embodiments, the deployable hanger, the fixed hanger and the inductive charger may be attached onto the assist handle to provide an assembled unit as assist handle assembly 30.

It should be appreciated that the assist handle assembly 30 may be located at one or more other locations on the vehicle 10, such as on the dashboard, a door side of the vehicle, a pillar and elsewhere on the vehicle 10. The assist handle assembly 30 may be an add-on assembly that can be assembled onto the vehicle 10 by a user with the releasable connectors, e.g., fasteners that allow for easy assembly and disassembly from the vehicle 10. The assist handle assembly 30 may thereby replace another assembly such as an assist handle that does not have any accessories, for example.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An assist handle assembly for a vehicle, the assist handle assembly comprising:
   an assist handle configured to be gripped by a user;
   a deployable hanger connected to the assist handle configured to hang a holder configured to hold a chargeable electronic device,
   a wireless charger connected to the assist handle and configured to charge the chargeable electronic device positioned proximate to a charging region of the charger; and
   a connector configured to secure the assist handle assembly to a structural component of the vehicle, wherein the connector is releasable to allow assembly and disassembly of the assist handle assembly from the vehicle.

2. The assist handle assembly of claim 1 further comprising a power cable for connecting to a vehicle power supply.

3. The assist handle assembly of claim 1, wherein the wireless charger comprises an inductive charger configured to inductively couple with charging circuitry in the electronic device.

4. The assist handle assembly of claim 3, wherein the inductive charger comprises inductive charging circuitry configured to couple with charging circuitry in the chargeable electronic device.

5. The assist handle assembly of claim 1 further comprising a wireless communication link.

6. The assist handle assembly of claim 5, wherein the wireless communication link communicates with the chargeable electronic device and one or more communication links on the vehicle to determine a location of the electronic device and a charging status of the chargeable electronic device.

7. The assist handle assembly of claim 6 further comprising a human machine interface output for communicating the charging status of the chargeable electronic device.

8. The assist handle assembly of claim 6, wherein the location of the electronic device is determined by processing wireless signals transmit between the electronic device and one or more signal communication devices on the vehicle.

9. The assist handle assembly of claim 1, wherein the chargeable electronic device comprise a phone.

10. An assist handle assembly for a vehicle, the assist handle assembly comprising:
    an assist handle configured to be gripped by a user;
    a hanger connected to the assist handle and configured to hang a holder configured to hold a chargeable electronic device;
    an inductive charger connected to the assist handle and configured to inductively couple with charging circuitry in the chargeable electronic device to charge the chargeable electronic device held in the holder hanging on the hanger; and
    a connector configured to secure the assist handle assembly to a structural component of the vehicle, wherein the connector is releasable to allow assembly and disassembly of the assist handle assembly from the vehicle, and wherein the hanger comprises a deployable hook.

11. The assist handle assembly of claim 10 further comprising a power cable for connecting to a vehicle power supply.

12. The assist handle assembly of claim 10 further comprising a wireless communication link.

13. The assist handle assembly of claim 12, wherein the wireless communication link communicates with the electronic device and one or more communication links on the vehicle to determine a location of the electronic device and a charging status of the chargeable electronic device.

14. The assist handle assembly of claim 13 further comprising a human machine interface output for communicating the charging status of the chargeable electronic device.

15. The assist handle assembly of claim 10, wherein the inductive charger comprises inductive charging circuitry configured to couple with charging circuitry in the chargeable electronic device.

16. The assist handle assembly of claim 10, wherein the electronic device comprise a phone.

\* \* \* \* \*